US012737683B2

(12) United States Patent
Patel et al.

(10) Patent No.: US 12,737,683 B2
(45) Date of Patent: Sep. 15, 2026

(54) SYSTEM AND METHOD FOR CONSTRUCTING TOP-PERFORMING PIPELINES USING HIERARCHICAL CONFIGURATION SPACE

(71) Applicant: INTERNATIONAL BUSINESS MACHINES CORPORATION, Armonk, NY (US)

(72) Inventors: Dhavalkumar C. Patel, White Plains, NY (US); Srideepika Jayaraman, White Plains, NY (US); Shuxin Lin, White Plains, NY (US); Anuradha Bhamidipaty, Yorktown Heights, NY (US); Jayant R. Kalagnanam, Briarcliff Manor, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/194,601

(22) Filed: Mar. 31, 2023

(65) Prior Publication Data

US 2024/0330756 A1 Oct. 3, 2024

(51) Int. Cl.
*G06N 20/00* (2019.01)
*G06N 5/022* (2023.01)

(52) U.S. Cl.
CPC ............. *G06N 20/00* (2019.01); *G06N 5/022* (2013.01)

(58) Field of Classification Search
None
See application file for complete search history.

(56) References Cited

U.S. PATENT DOCUMENTS 11,037,070 B2 * 6/2021 Salganicoff ............ G06N 20/00
11,144,289 B1 10/2021 Hwang
2013/0091128 A1 * 4/2013 Radinsky .......... G06F 16/24578 707/723

(Continued)

FOREIGN PATENT DOCUMENTS

EP 3779806 A1 2/2021
EP 4060517 A1 * 9/2022 ............. G06N 20/00
WO 2014/075108 W2 5/2014

OTHER PUBLICATIONS

NPL Cerrada AutoML for Feature Selection 2022.*

(Continued)

*Primary Examiner* — Paul M Knight
(74) *Attorney, Agent, or Firm* — CHIP LAW GROUP

(57) ABSTRACT

A computer-implemented method for developing a hierarchical machine-learning pipeline can include receiving a hierarchy specification, a set of estimators for the root node, and one or more transformer options for each of the transformer nodes. The hierarchy specification provides a configuration of the root node, transformer nodes, and edges interconnecting the root and transformer nodes. A rank can be obtained for each estimator in the root node. A hierarchy pipeline traverser can then traverse a first child layer of the transformer nodes connected to the root node via one of the edges. A first ranked list of pathways can be determined with respect to the one or more transformer options selected for the first child layer and at least one selected estimator of the root node.

20 Claims, 10 Drawing Sheets

(56) References Cited

U.S. PATENT DOCUMENTS

| | | | | |
|---|---|---|---|---|
| 2013/0103624 | A1* | 4/2013 | Thieberger | G06N 20/00 706/12 |
| 2019/0102706 | A1* | 4/2019 | Frank | G06N 5/046 |
| 2020/0005148 | A1* | 1/2020 | Nori | G06N 3/084 |
| 2020/0242483 | A1* | 7/2020 | Shashikant Rao | G06N 3/0985 |
| 2021/0081841 | A1* | 3/2021 | Sikka | G06N 3/105 |
| 2021/0241152 | A1 | 8/2021 | Fong | |
| 2022/0004897 | A1 | 1/2022 | Jadon | |
| 2022/0014424 | A1* | 1/2022 | Yadav | G06N 5/04 |
| 2022/0044078 | A1 | 2/2022 | Sathe | |
| 2022/0051049 | A1 | 2/2022 | Wang | |
| 2022/0171985 | A1 | 6/2022 | Gorbach | |
| 2022/0172002 | A1* | 6/2022 | Shrivastava | G06F 18/2113 |
| 2022/0261598 | A1 | 8/2022 | Chen | |
| 2022/0292309 | A1* | 9/2022 | Ashrafi | G06F 18/2148 |
| 2024/0265275 | A1* | 8/2024 | Zhang | G06N 5/01 |

OTHER PUBLICATIONS

NPL Chen Techniques for AutoML 2021.*

NPL Chen XGBoost A Scalable Tree Boosting System 2016.*

NPL Elshawi Automated Machine Learning Techniques and Frameworks 2020.*

NPL Karmaker AutoML to Date and Beyond 2021.*

NPL Mohr Predicting Machine Learning Pipeline Runtimes in AutoML 2021.*

NPL Moore Data Structures The Tree 2021.*

NPL Olson TPOT A Tree based Pipeline Optimization Tool for Automated ML 2016.*

NPL Patel SmartML IBM 2020.*

NPL Pykes Building Reproducible Machine Learning Pipelines 2021.*

NPL Rakotoarison Automated Machine Learning with Monte Carlo Search 2019.*

NPL Shen A Tree Based Machine Learning Method for Pipeline Leakage Detection 2022.*

NPL Spark ML Pipelines Wayback Machine 2022.*

NPL Swearingen ATM A distributed collaborative, scalable system for AutoML 2017.*

NPL Thornton AutoWEKA Automated Selection 2012.*

NPL Wever AutoML for Multi Label Classification 2021.*

NPL Zheng AutoML for Deep Recommender Systems Jan. 2023.*

Xiang, C. et al., "A new parameters joint optimization method of chaotic time series prediction"; International Jouranl of the Physical Sciences (2011), vol. 6:10, pp. 2565-2571.

Patel, D. et al., "Doctor for Machines: A Failure Pattern Analysis Solution for Industry 4.0"; 2020 IEEE International Conference on Big Data (2020); 1 pg.

Patel, D. et al., "FLOps: On Learning Important Time Series Features for Real-Valued Prediction"; 2020 IEEE International Conference on Big Data (2020); 1 pg.

Patel, D. et al., "Smart-ML: A System for Machine Learning Model Exploration using Pipeline Graph"; 2020 IEEE International Conference on Big Data (2020); 1 pg.

Suzen, M., et al., "Generalised learning of time-series: Ornstein-Uhlenbeck processes"; arXiv:1910.09394v3 (2021), 6 pgs.

Sabharwal, A. "Selecting Near-Optimal Learners via Incremental Data Allocation", arXiv:1601.00024v1 [cs.LG] (2015), 18 pgs.

* cited by examiner

SYSTEM AND METHOD FOR CONSTRUCTING TOP-PERFORMING PIPELINES USING HIERARCHICAL CONFIGURATION SPACE

BACKGROUND

Technical Field

The present disclosure generally relates to artificial intelligence, automatic machine learning, data science, time series analysis, and failure prediction technologies, and more particularly, to a computer-implemented method, a computer system, and a computer program product for constructing a machine learning pipeline using a hierarchical configuration space.

Description of the Related Art

Machine learning pipelines are, generally, a multi-step workflow where data is fed into the pipeline and undergoes a series of transformations via one or more transformers and one or more estimators. In a time-series modality, there are several modules involved, such as data transformation modules, scaling modules, feature extraction modules, label generation modules, and output transformation modules. Within each of these modules, there are a plurality of options to choose from, such as twenty or more data transformation modules, ten or more scaling modules, and 120 or more feature extraction modules. Thus, to define a pipeline as a directed acyclic graph (DAG) through these modules, the number of possible paths is large. Going through these possible pipelines to discover the top performing pipelines can take significant time and computing resources.

SUMMARY

In one embodiment, a computer-implemented method for developing a hierarchical machine-learning pipeline can include receiving a hierarchy specification from a user, the hierarchy specification providing a root node, transformer nodes, and edges interconnecting the nodes, wherein a set of estimators are selected by the user for the root node, and one or more transformer options are selected for each of the transformer nodes. A rank can be obtained for each estimator in the root node. A hierarchy pipeline traverser can then traverse a first child layer of the transformer nodes connected to the root node via one of the edges. A first ranked list of pathways can be determined with respect to the one or more transformer options selected for the first child layer and at least one selected estimator of the root node.

In one embodiment, a computer implemented method for developing a hierarchical machine-learning pipeline can include receiving a hierarchy specification from a user, the hierarchy specification providing a root node, transformer nodes, and edges interconnecting the nodes, wherein a set of estimators are selected by the user for the root node, and one or more transformer options are selected for each of the transformer nodes. The method can also include receiving a configuration specification from the user, the configuration specification defining preferences, priorities and/or constraints to be used by a hierarchy pipeline traverser. A rank can be obtained for each estimator in the root node. A hierarchy pipeline traverser can traverse a first child layer of the transformer nodes connected to the root node via one of the edges to determine a first ranked list of pathways with respect to the one or more transformer options selected for the first child layer and at least one selected estimator of the root node. The hierarchy pipeline traverser can traverse a second child layer of the transformer nodes connected to either the first child layer or the root node by one of the edges to determine a second ranked list of pathways with respect to the one or more transformer options selected for the first child layer, the second child layer, and at least one selected estimator of the root node.

By virtue of the concepts discussed herein, systems and methods are provided for incorporating a user's preferences by inputting a hierarchical set of components that could be explored in combination with each other in a step-wise manner, to not only limit the large search space but also make intelligent decisions based on rules set by the user, for developing top performing machine learning pipelines. Aspects of the present disclosure can reduce the time and computing resources involved to generate top performing machine learning pipelines, especially with respect to machine learning pipelines for a time series data modality.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all the components or steps that are illustrated. When the same numeral appears in different drawings, it refers to the same or like components or steps.

DETAILED DESCRIPTION

In the following detailed description, numerous specific details are set forth by way of examples to provide a thorough understanding of the relevant teachings. However, it should be apparent that the present teachings may be practiced without such details. In other instances, well-known methods, procedures, components, and/or circuitry have been described at a relatively high-level, without detail, to avoid unnecessarily obscuring aspects of the present teachings.

Due to the nature of the multiple tables present in the multi-variate multi data time series datasets, aspects of the present disclosure provide a system and method for incorporating a user's preferences by inputting a hierarchical set of components that could be explored in combination with each other in a step-wise manner, to not only limit the large search space but also make intelligent decisions based on rules set by the user, for developing top performing machine learning pipelines.

A hierarchical optimizer can be provided to take advantage of these datasets and prepare the datasets necessary for each part of the hierarchical set up for each corresponding transformer. In general, the optimization space is quite large due to the large number of combinations that are possible from the data operators, transformers and estimators. However, in most cases, the user has a pre-decided set of preferences on which combinations would need to be explored. The hierarchical optimizer can capture these preferences in a hierarchical table with each level including a set of operators defined by the user, along with a set of rules to use in the exploration of the pipeline building. The rigid nature of combining features and operators can be transformed into an optimizer that creates a dynamic pipeline based on the user preferences, based on the results from each combination.

Since the user may not have complete knowledge about the best pipelines, the hierarchical optimizer can provide a way for the user to write a general purpose optimizer without having to worry about the optimization space.

Figure 1:
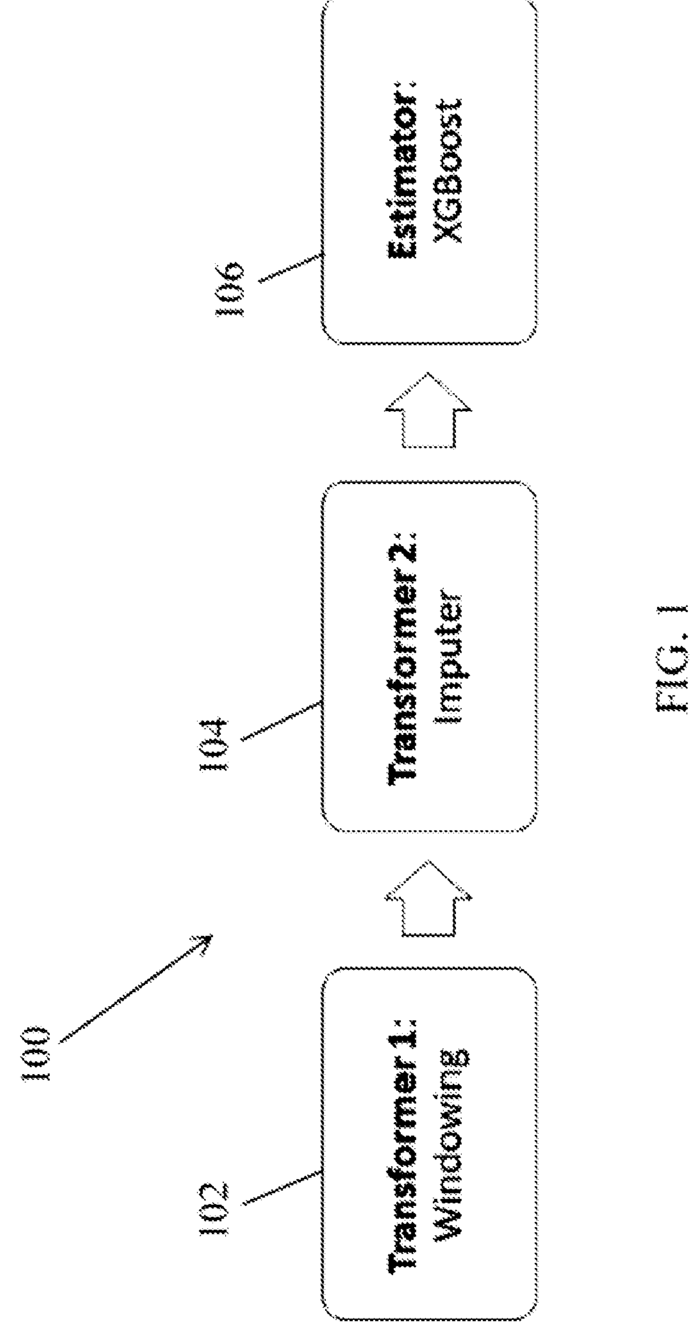
FIG. 1 shows a machine learning pipeline, consistent with an illustrative embodiment.

Referring to FIG. 1, a schematic representation of a machine learning pipeline 100 is illustrated. The machine learning pipeline 100 may include one or more transformers, such as a windowing transformer 102 and an imputer transformer 104, as well as one or more estimators, such as an XGBoost estimator 106. As described in greater detail below, the transformers and estimators may be selected, for example, by a user, from a knowledge base of multiple selectable transformers and estimators.

Figure 2:
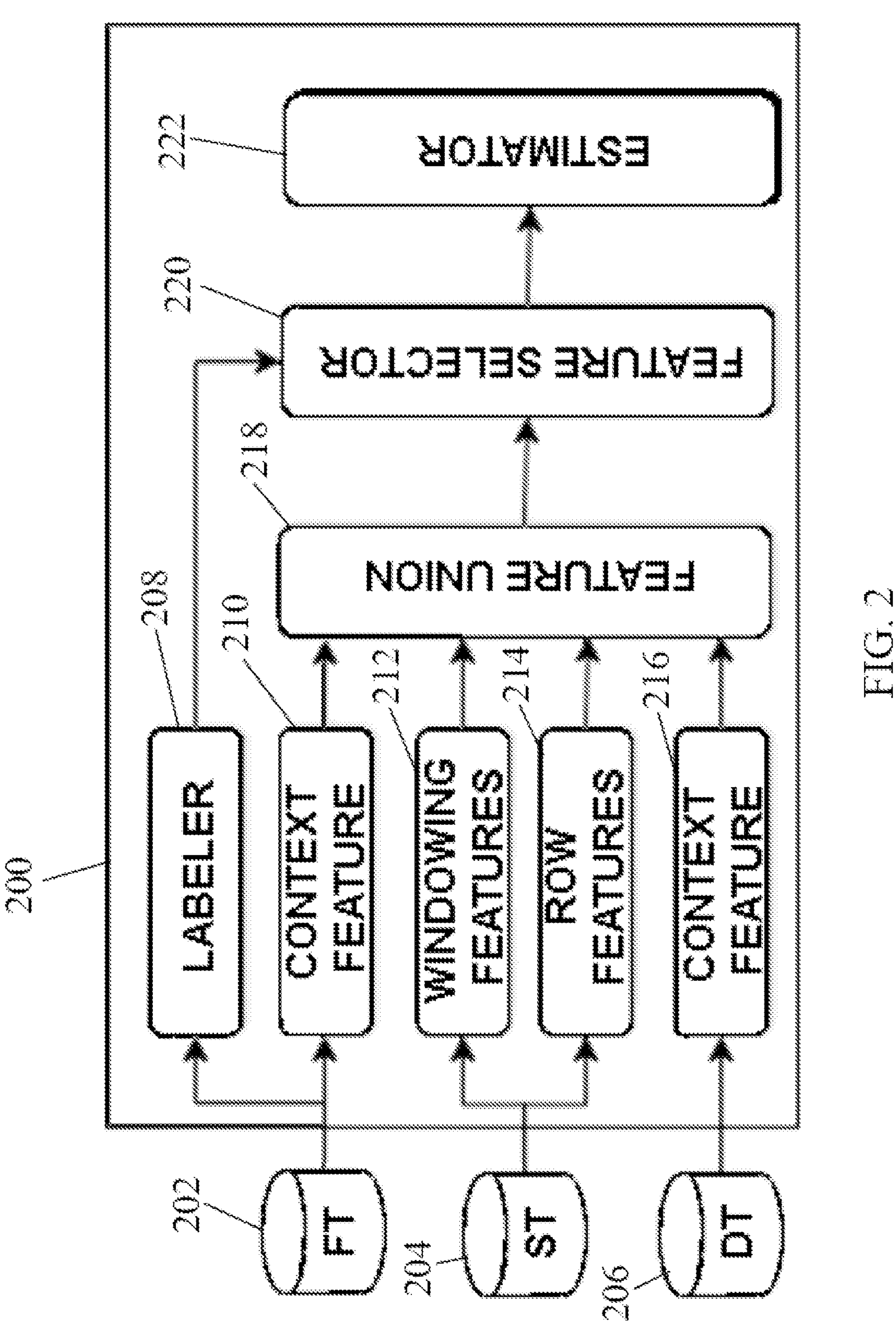
FIG. 2 shows a machine learning pipeline usable in a failure pattern analysis system, consistent with an illustrative embodiment.

FIG. 2 illustrates a machine learning pipeline 200 that may be used in a failure pattern analysis model. A set of datasets, including a feature table 202, a sensor table 204 and a down-time table 206, may be provided to the machine learning pipeline 200. The machine learning pipeline 200 may include various transformers, including a labeler 208, a context feature transformer 210, a windows feature transformer 212, a row features transformer, a context feature transformer 216, a feature union transformer 218 and a feature selector 220. The machine learning pipeline 200 may further include an estimator 222, which may be selected from one or more known estimators, such as linear regression, decision tree, support vector machines, adaptive boost classifier, random forest, naïve Bayes, or the like.

Figure 3:
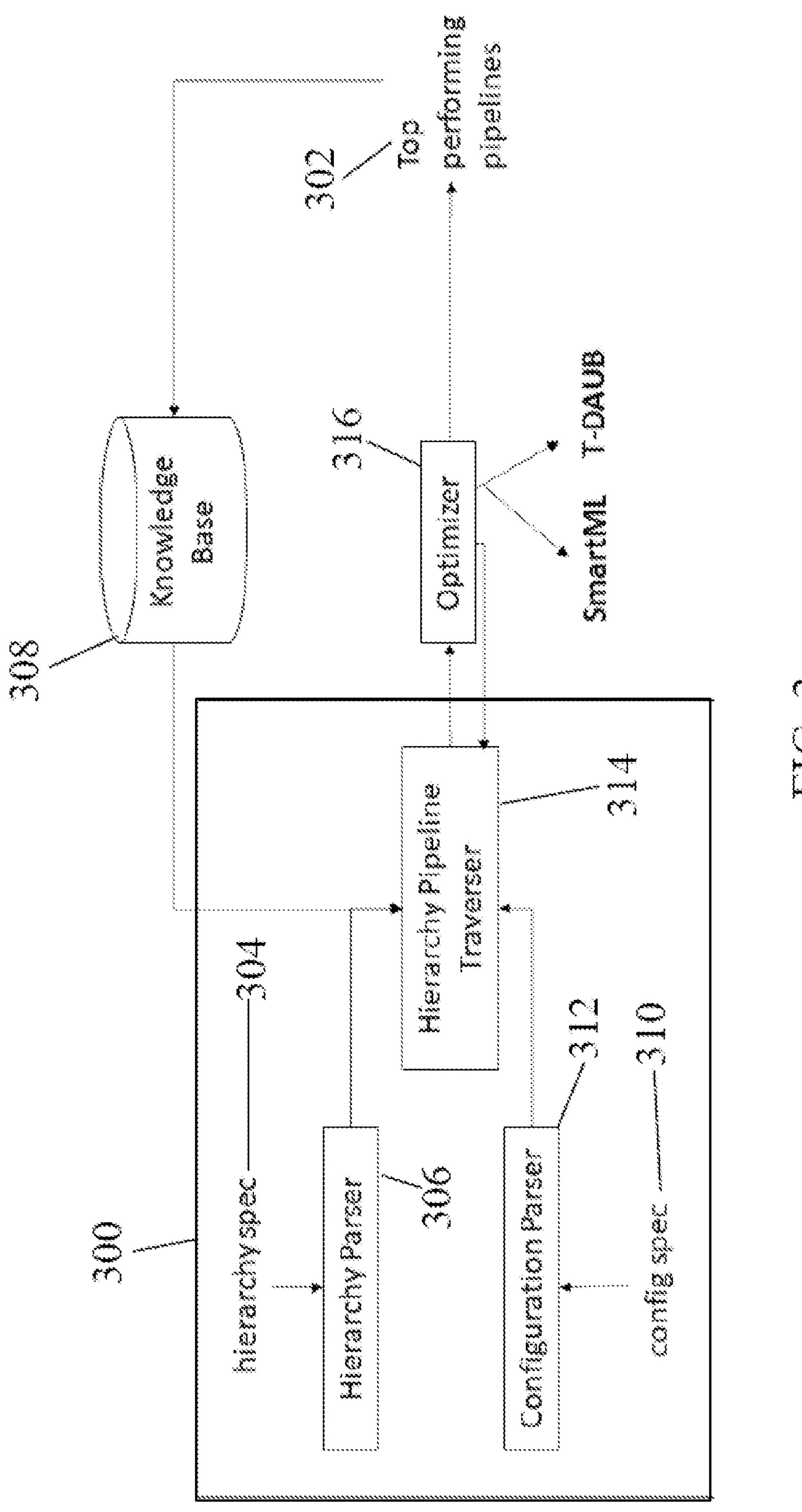
FIG. 3 shows components of a hierarchical optimizer, consistent with an embodiment of the present disclosure.

Referring now to FIG. 3, a hierarchical optimizer 300 can be used to obtain top performing pipelines 302. As used herein, a "top performing pipeline" may refer to a selected number of pipelines that perform achieving a particular performance metric (e.g., the best). For example, in a failure pattern analysis, a given performance metric such as Area Under the Receiver Operating Characteristic Curve (ROC: AUC), PR(Precision-Recall score), and/or runtime values may be used to determine top performing pipelines. The number of pipelines in the top performing pipelines may be a static number of pipelines, such as 10 pipelines, or may be a percentage of the total number of paths in a DAG that created the top performing pipelines. For example, if there are 2,000 possible pipelines in a DAG, a selection of one percent for the number of top performing pipelines would provide an output of 20 top performing pipelines.

The hierarchical optimizer 300 can include a user prepared hierarchy specification 304 and a user prepared configuration specification 310, to provide options for a hierarchy pipeline traverser 314 to generate and test the performance of various potential machine learning pipelines. Various methods may be utilized for a user to provide the details, as discussed in greater detail below, for the hierarchy specification 304 and the configuration specification 310, such as a graphical user interface that provides for the selection and organization of these specifications.

Figure 4:
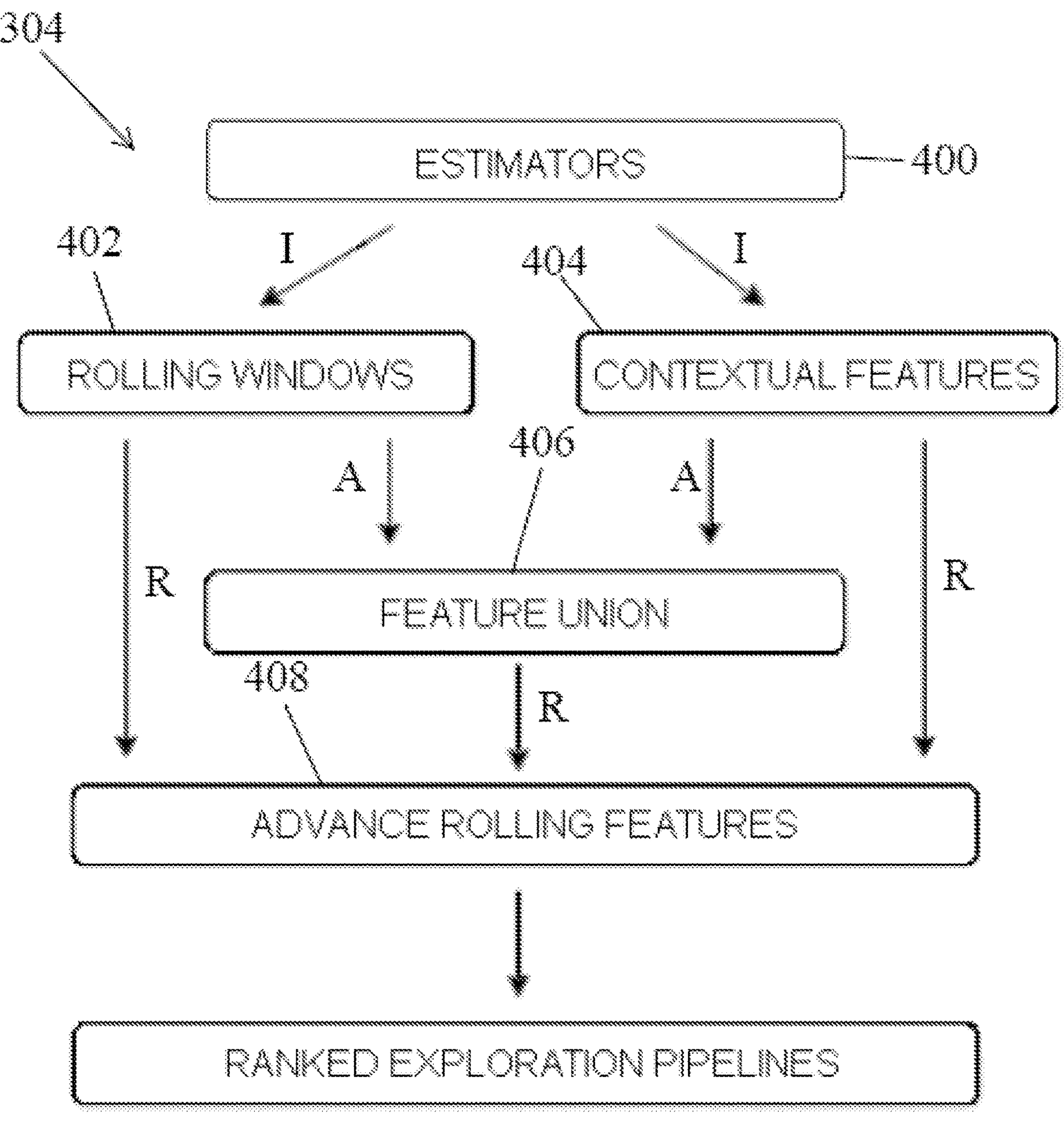
FIG. 4 shows an example of a hierarchy specification provided to the hierarchical optimizer of FIG. 3, consistent with an illustrative embodiment.

Referring to FIG. 4, the hierarchy specification 304 can be built by a user by first building the root node 400, which typically includes one or more estimator selections. Various transformers may be selected as nodes, such as a rolling windows transformer node 402, a contextual features transformer node 404, a feature union node 406, and an advance rolling features transformer node 408. Each edge that interconnects the nodes may be connected with an annotation selected from insert (I), append (A) or replace (R). When an edge is annotated as insert, the child node will be inserted into the pathway. When an edge is annotated as append, where a node receives data from two parent nodes, the append edge will form a union of the data for the pathway. When an edge is annotated as replace, the child node will replace the transformer from the parent node.

An example of a hierarchy specification 304 is shown below:

```
def construct__ graph ( ) :
   pgraph = PipelineGraph (type = 'Hierachy')
   stage = [name = 'Estimator', is root = Yes, options = [('lr', LR( )), ('svm', SVM( )) , (., . ) ] ]
   # stage 1 : estimators
   estimator__ stage__id = pgraph.add__node(stage)
   # stage 2 : rolling feature
   stage = [name = ' Rolling Window', options = [('S', Simple( )), ('H', HigherOrder ( )), (., .)]]
   rwin__id = pgraph.add__node (stage)
   # stage 3 : context feature
   stage = [name = 'Context Features', options = [('FC', FailureCode ( )), ('TPF',
TotalPreviousFailures( ) ), (. , .) ]]
   cont__id = pgraph.add__node (stage)
   # stage 4 : feature union
   stage = [name= 'Feature Union', options = [('S', Simple( ) ), ('HO', HigherOrder ( )), (., .)]]
   f__union__id = pgraph.add__node (stage)
   # stage 5 : Advance union
```

-continued

```
stage = [name = 'Advance Feature', options = (('W', Wavelet( ) ), ('fft', FFT ( )), ( ., .) ] ]
adv__fea__id = pgraph.add__node (stage)
# edges : Add edges
pgraph.add__edge (rwin__id, estimator__stage__id, type = 'insert' )
pgraph.add__edge (cont__id, estimator__stage__id, type = 'insert' )
pgraph.add__edge (f__union__id, rwin__id, type = 'append' )
pgraph.add__edge (f__union__id, cont__id, type = 'append' )
pgraph.add__edge (adv__fea__id, cont__id, type = 'replace' )
pgraph.add__edge (adv__fea__id, cont__id, type = 'replace' )
pgraph.add__edge (adv__fea__id, cont__id, type = 'replace' )
return pgraph.
```

As can be seen, there are two options, linear regression (lr) and support vector machines (svm) for the estimators, two options, simple and higher order for the rolling window, and the like. The hierarchy specification 304 shown above also defines the nodes as being insert, append or replace.

In creating the hierarchy specification 304, the user may be provided guidelines by the hierarchical optimizer 300, such as (1) to arrange compulsory components in the root; (2) to put preferred components near to the root, that is, placing preferred transformer nodes closer to the root as compared to non-preferred transformer nodes (for example, if rolling windows is a preferred component, it should be placed before a non-preferred component, such as advance rolling features, as shown in FIG. 4); (3) to push the components with high time/memory complexity toward the leaf (where the time/memory complexity may be provided by the knowledge base 308), in other words placing the transformer nodes having a greater time and/or memory complexity in a layer of the hierarchy specification farther away from the root node as compared to transformer nodes having a lesser time and/or memory complexity; (4) some components can be present multiple times with different configuration, such rolling window with a lookback of 7 and a rolling window with a lookback of 30, for example; (4) to annotate each edge with append, replace, or insert annotations; and (5) that feature extraction using a single table should be prioritized over multiple tables.

The knowledge base 308 may provide the components that the user may select from for the various nodes. For example, for the root node 400 (estimators), the knowledge base can provide linear regression models, SVM models, imbalanced classifier models, or the like. The knowledge base 308 can further include other transformers, estimators, feature extractors, machine learning models, and the like.

Once the hierarchy specification 304 is established, a hierarchy parser 306 may check the user-created hierarchy specification 304 for syntax and provide the user with an indication of any needed changes or corrections. Once the hierarchy specification 304 is complete, the computing device can receive the hierarchy specification 304 in an electronic data packet. In one embodiment, the hierarchy specification 304 is received from a user, who may then establish the configuration specification 310.

The configuration specification 310 can include specific rules for the nodes and the edges of the hierarchy specification 304. These rules may provide preferences, priorities and constraints on the hierarchy pipeline traverser 314 when traversing the nodes. For example, the user may select, from a user interface of a computing device, to order options based on their temporal execution profile for the selected estimators. In this way, as discussed in greater detail below, the hierarchy pipeline traverser 314 may select the estimators based on their temporal execution profile. Other node options include (1) order options based on the number of features they generate (used for feature extractor and feature union nodes), (2) relative ordering of various options within block: linear models are preferred than tree-based models (used for estimator nodes), (3) run at least x options, where x is user-selected, before going to the next node in the tree (used for any node), or (4) condition on parameter tunings (used for any node). Edge options can include (1) compatibility based rules, such as where scaling is needed for multilayer layer perceptron (MLP) and principal component analysis (PCA) components, an edge can be removed that connect PCA/MLP but no scaling, (2) constraints on previous outputs, such as the number of features cannot be higher than P for a particular component, or (3) rules based on multiple tables, for example. The application of both node and edge-based rules are discussed below with respect to the operation of the hierarchy pipeline traverser 314.

Once the configuration specification 310 is established, a configuration parser 312 may check the user-created configuration specification 310 for syntax and provide the user with an indication of any needed changes or corrections. Once the configuration specification 310 is complete, the computing device can receive the configuration specification 310 in an electronic data packet. In one embodiment, the configuration specification 310 is received from a user.

Figure 5:
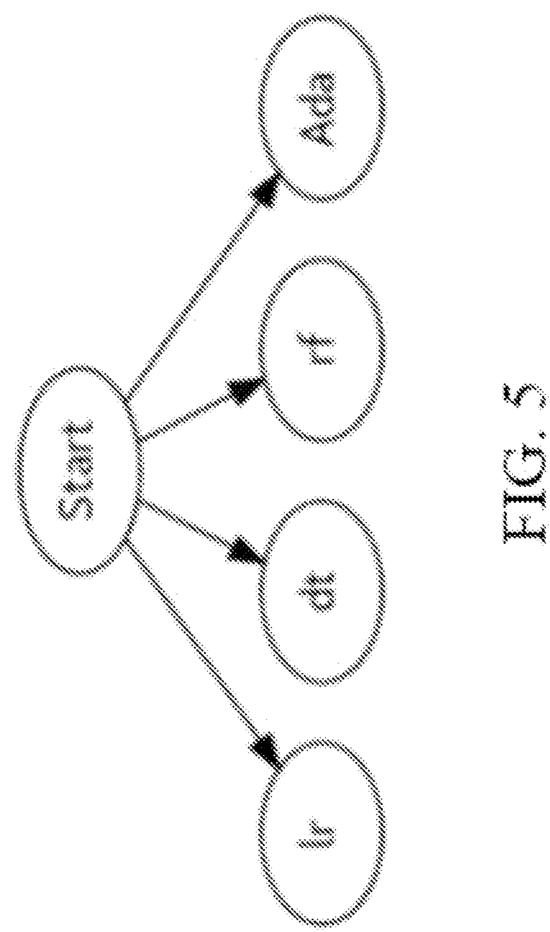
FIG. 5 shows an initial selection of estimators by a hierarchy pipeline traverser of the hierarchical optimizer of FIG. 3, consistent with an illustrative embodiment.

Referring also to FIG. 5, given the hierarchy specification 304 and the configuration specification 310, with a single root node 400, the pipeline discovery process, at the hierarchy pipeline traverser 314, can proceed by first traversing the root node 400 (estimators). If the rank is already fixed for the estimators of the root node 400, then this step can be ignored. Otherwise, the hierarchy pipeline traverser 314 can obtain a ranked list of pathways at the root node by passing data through each of the options for the estimator selected by the user in the hierarchy specification 304. As shown in FIG. 5, the output can provide an identification of the estimator's rank, such as linear regression (LR), decision tree (DT), random forest (RF) and adaptive boost classifier (ADA).

Figure 6B:
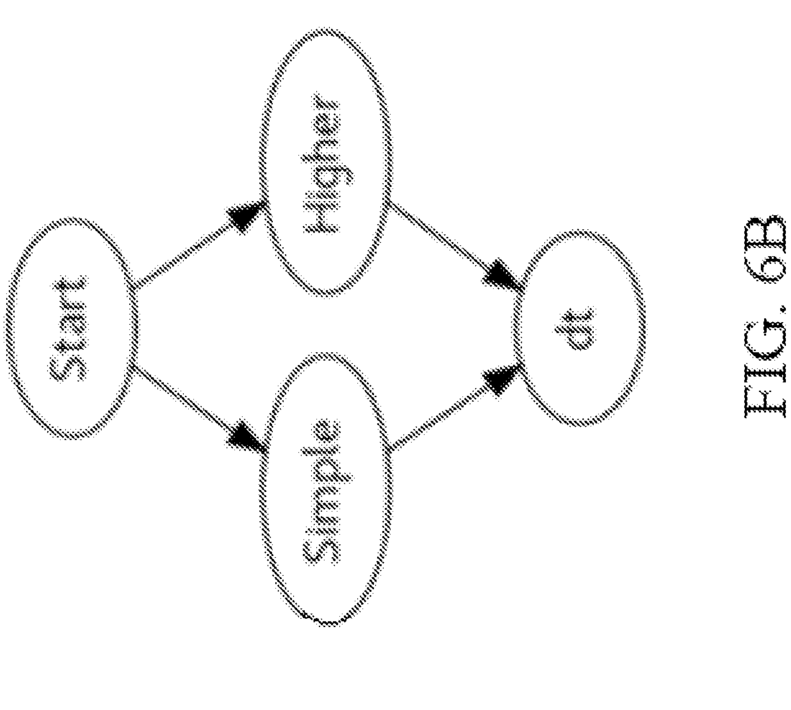
FIGS. 6A through 6D illustrate options for traversing a first child layer by a hierarchy pipeline traverser of the hierarchical optimizer of FIG. 3, consistent with an illustrative embodiment.
Figure 6A:
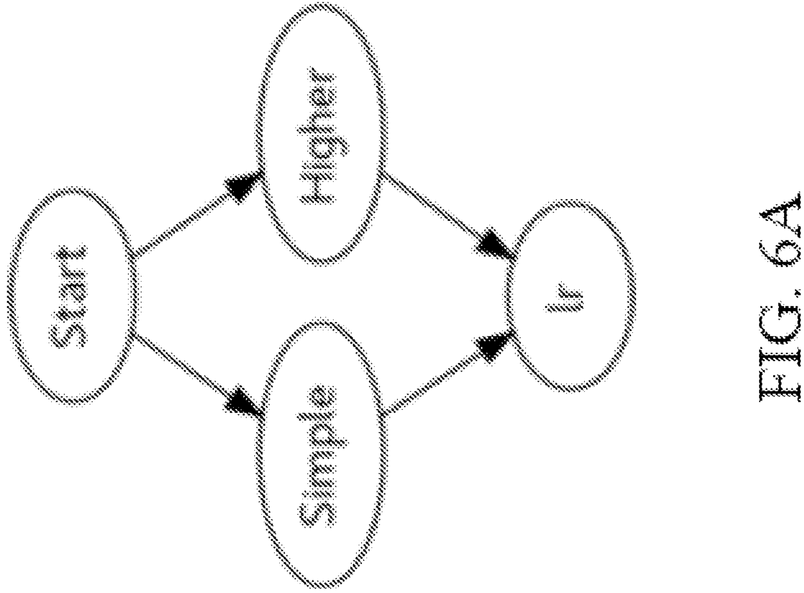
Figures 6C, 6D:
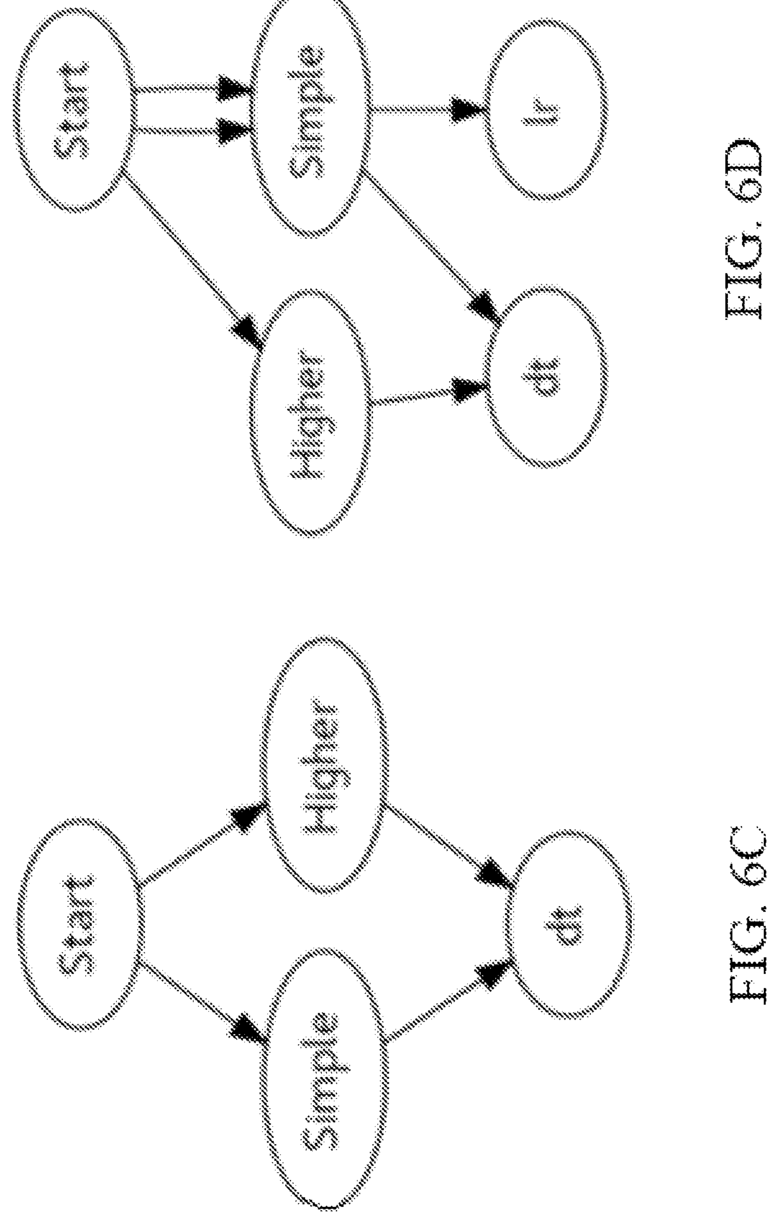

Referring to FIGS. 6A through 6D, next, the hierarchy pipeline traverser 314 can traverse the next child layer of nodes, (i.e., Rolling Window and Contextual Features in the current example of the hierarchy specification 304) with respect to each selected estimators. In some embodiments, the hierarchy pipeline traverser 314 can explore a predetermined number of ranked estimators, such as the top-X ranked estimators based on the configuration specification 310. The objective of the traversal of the next nodes remains the same—to find the ranked list of pathways at the current node with respect to previously selected components. FIG. 6A illustrates a composition of a DAG using a selected estimator (lr) and all the options at rolling windows. FIG. 6B illustrates a composition of a DAG using a selected estimator (dt) and all the options at rolling windows. FIG. 6C shows a joint DAG where both estimators, dt and Ir are used with both the simple and higher options for the rolling windows. FIG. 6D shows a joint DAG where the estimator Ir is not used with the rolling window is selected as higher. The absence of this edge may be based on the configuration specification 310, where the user may have prior knowledge that this combination does not generate a good result and thus, should be excluded from the hierarchy pipeline traverser 314. In some embodiments, a node may get eliminated based on the incoming data, such as if incoming data has a negative value, "log", "box-cox", or the like.

Figure 7:
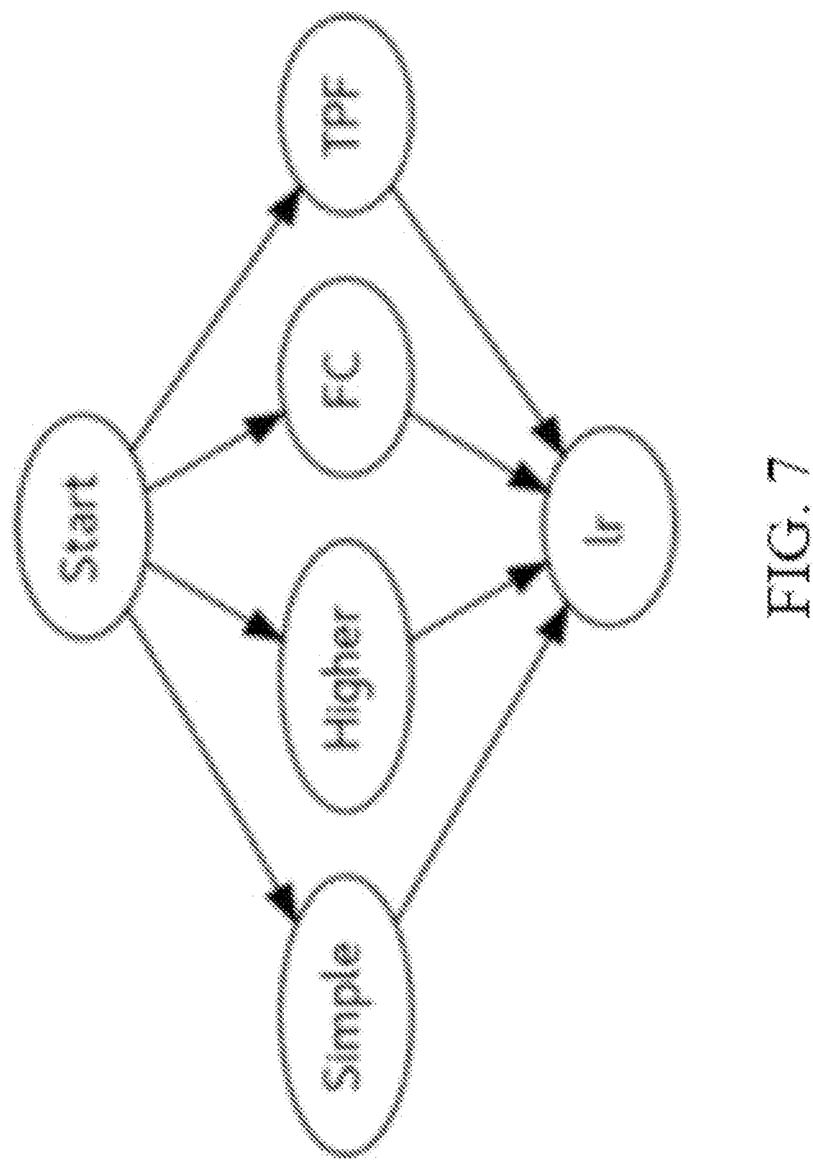
FIG. 7 shows how the hierarchy pipeline traverser can make an execution plan by exploring one node at a time, consistent with an illustrative embodiment.
Figure 8:
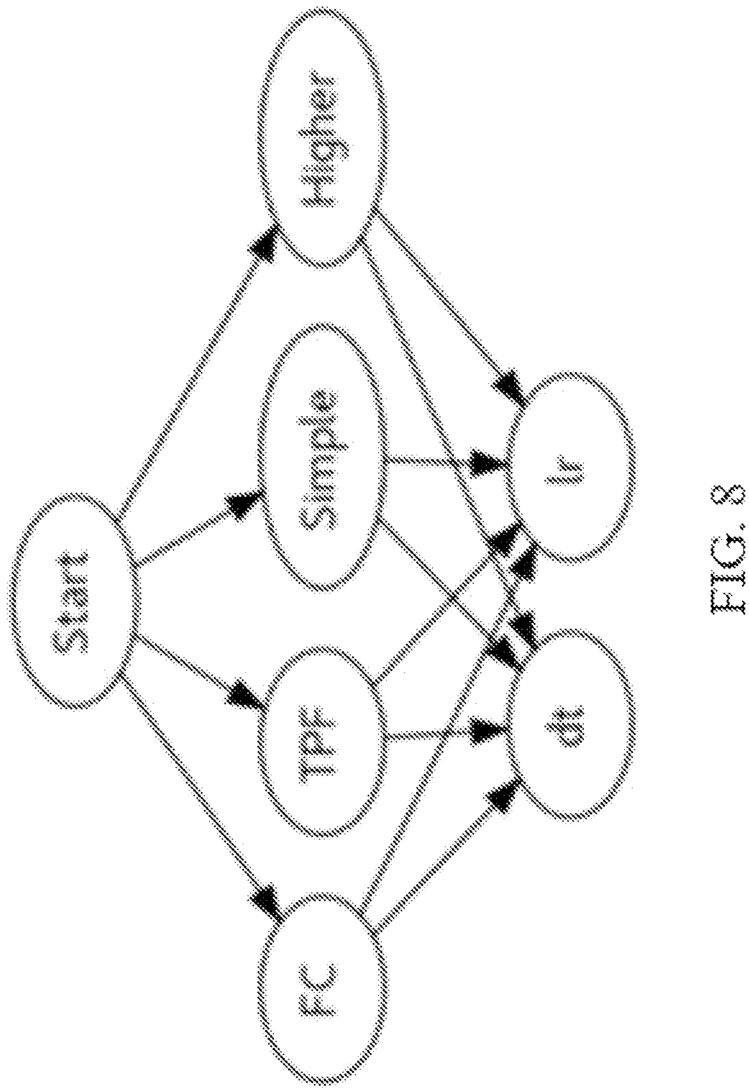
FIG. 8 shows how the hierarchy pipeline traverser can make an execution plan by exploring more than one node at a time, consistent with an illustrative embodiment.

A decision can be made to select rolling window, contextual features or both. This decision may be, for example, based on availability of resources. Thus, the hierarchy pipeline traverser 314 can make an execution plans such as exploring one node at a time, as shown in FIG. 7, or to explore more than one node at a time, as shown in FIG. 8.

The entire hierarchy specification 304 can be explored iteratively until the top performing pipelines 302 are found. An optimizer 316 may be used to provide feedback to the hierarchy pipeline traverser 314 as the explored pipelines converge into the top performing pipelines 302. As can be seen, the organization of the DAG is in reverse order than the hierarchy specification 304 as the DAG is getting iteratively explored by the hierarchy pipeline traverser 314. To save additional time, in some embodiments, the storage of intermediate output of the pipeline can be provided such that it can be used to accelerate the processing.

In summary, due to the nature of the multiple tables present in the multi-variate multi data time series datasets, the hierarchical optimizer 300 can take advantage of these datasets and prepare the datasets necessary for each part of the hierarchical set up for each corresponding transformer. In general, the optimization space is quite large due to the large number of combinations that are possible from the data operators, transformers and estimators. However, in most cases, the user has a pre-decided set of preferences on which combinations would need to be explored. The hierarchical optimizer 300 can capture these preferences in the hierarchy specification 304 and the configuration specification 310, with each level containing a set of operators defined by the user, along with a set of rules to use in the exploration of the pipeline building. The rigid nature of combining features and operators can be transformed into an optimizer which creates a dynamic pipeline based on the user preferences, based on the results from each combination. Since the user may not have complete knowledge about the best pipelines, the hierarchical optimizer 300 can provide a way for them to write a general purpose optimizer without having to worry about the optimization space.

The pipeline component exploration tool according to the present disclosure can be useful when the user has some general ideas of the pipeline construction and wants to expand on the number of pipelines that are to be considered for benchmarking. As described above, the user provides a hierarchical configuration space of the various components as input to the hierarchical optimizer 300, where, as shown in FIG. 4, each node is a pipeline component with many choices. For example, "Estimator" node represents a list of possible estimators the user would like to try. Next, nodes are organized in some meaningful way such that the hierarchical optimizer 300 considers all components given by the user in at least one pipeline, and adds more options of better performing models, and fewer options of worse performing ones, based on the observed performance. This solves an innovative problem of how an end user can explore some of the "new components" in a more controlled manner.

Given a hierarchical configuration with a single root node, the hierarchical optimizer process goes on as follows: In the first step, the aim is to discover a ranked list of estimators. To obtain the rank in an efficient manner, a successive halving method on input list of estimators may be used. In this successive halving process, each estimator is executed with default parameters on the input dataset in the first step, and p %(=50%) of top performing estimators are evaluated for randomized search in the second step. Once the estimator rank is identified, the hierarchical optimizer traverses the next node (Rolling Window and Contextual Features in current example) with respect to each selected estimators (it may explore top-3 ranked estimators in turn, for example).

At this point, the hierarchical optimizer knows the base estimators that perform well and also the individual transformers that can help achieve better performance on top of the base estimators. Next, the feature union transformer is applied to generate a pipeline with more feature transformations. In the current setting, all the pipelines can be merged together that share a common estimator to form a giant pipeline with many feature transformations. The giant pipeline can be evaluated and its performance can be obtained. Pipelines that perform better than its respective base estimator are passed to "Advance Rolling Features". This node selects pipelines with Rolling Window Transformer and replaces it by higher order rolling window transformer which aims to extract higher order statistics from the data.

Although the operational/functional descriptions described herein may be understandable by the human mind, they are not abstract ideas of the operations/functions divorced from computational implementation of those operations/functions. Rather, the operations/functions represent a specification for an appropriately configured computing device. As discussed in detail above, the operational/functional language is to be read in its proper technological context, i.e., as concrete specifications for physical implementations.

Accordingly, one or more of the methodologies discussed herein may obviate a need for time consuming data processing by the user in efforts to develop machine learning pipelines. This may have the technical effect of reducing computing resources used by one or more devices within the system. Examples of such computing resources include, without limitation, processor cycles, network traffic, memory usage, storage space, and power consumption.

It should be appreciated that aspects of the teachings herein are beyond the capability of a human mind. It should also be appreciated that the various embodiments of the subject disclosure described herein can include information that is impossible to obtain manually by an entity, such as a human user. For example, the type, amount, and/or variety of information included in performing the process discussed herein can be more complex than information that could be reasonably be processed manually by a human user.

Example Computing Platform

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 9:
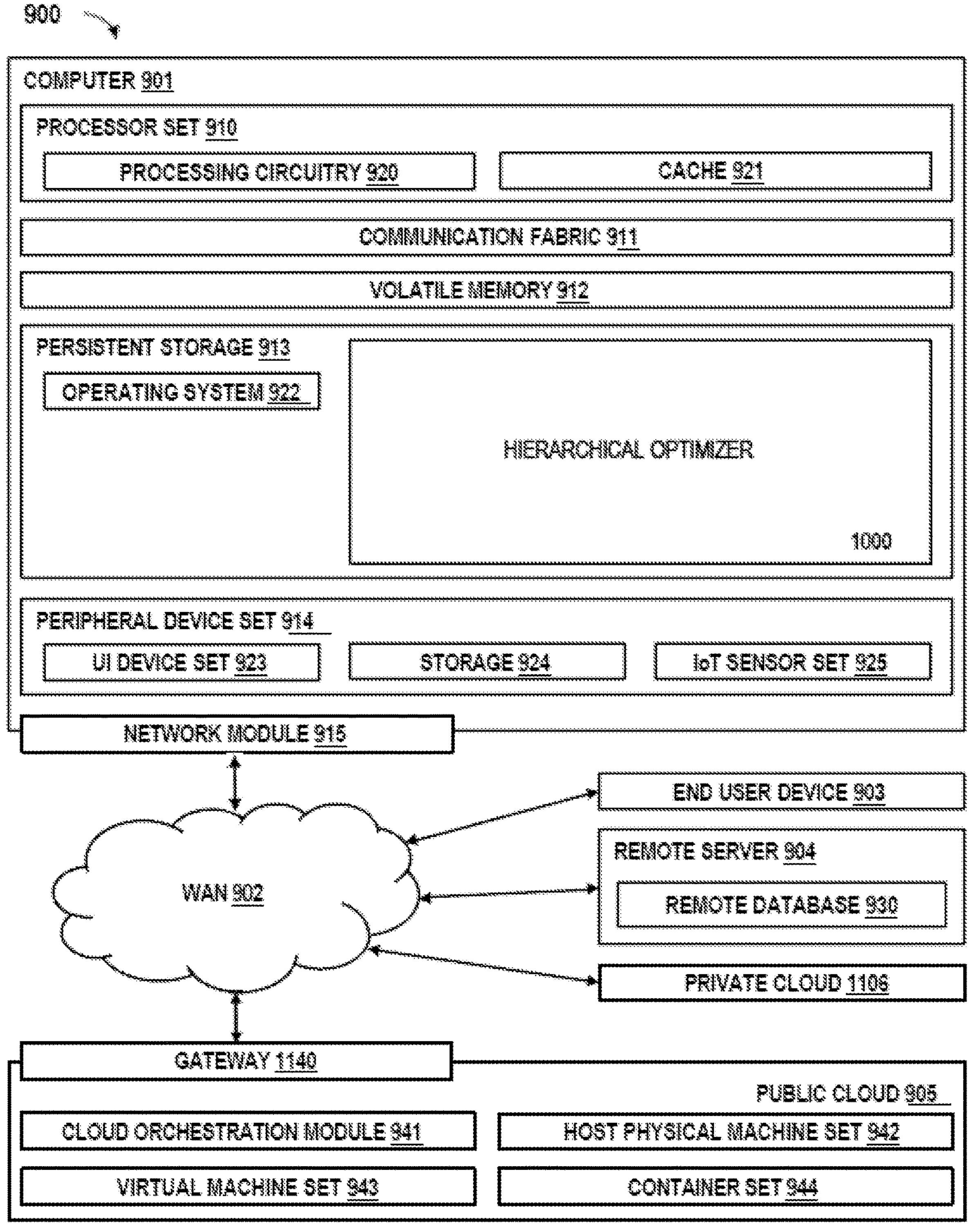
FIG. 9 is a functional block diagram illustration of a computer hardware platform that can be used to implement the method for developing a hierarchical machine-learning pipeline, according to an illustrative embodiment.

Referring to FIG. 9, computing environment 900 includes an example of an environment for the execution of at least some of the computer code involved in performing the inventive methods, a hierarchical optimizer block 1000. In addition to block 1000, computing environment 900 includes, for example, computer 901, wide area network (WAN) 902, end user device (EUD) 903, remote server 904, public cloud 905, and private cloud 906. In this embodiment, computer 901 includes processor set 910 (including processing circuitry 920 and cache 921), communication fabric 911, volatile memory 912, persistent storage 913 (including operating system 922 and block 1000, as identified above), peripheral device set 914 (including user interface (UI) device set 923, storage 924, and Internet of Things (IoT) sensor set 925), and network module 915. Remote server 904 includes remote database 930. Public cloud 905 includes gateway 940, cloud orchestration module 941, host physical machine set 942, virtual machine set 943, and container set 944.

COMPUTER 901 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 930. As is well understood in the art of computer technology, and depending upon the technology, performance of a computer-implemented method may be distributed among multiple computers and/or between multiple locations. On the other hand, in this presentation of computing environment 900, detailed discussion is focused on a single computer, specifically computer 901, to keep the presentation as simple as possible. Computer 901 may be located in a cloud, even though it is not shown in a cloud in FIG. 9. On the other hand, computer 901 is not required to be in a cloud except to any extent as may be affirmatively indicated.

PROCESSOR SET 910 includes one, or more, computer processors of any type now known or to be developed in the future. Processing circuitry 920 may be distributed over multiple packages, for example, multiple, coordinated integrated circuit chips. Processing circuitry 920 may implement multiple processor threads and/or multiple processor cores. Cache 921 is memory that is located in the processor chip package(s) and is typically used for data or code that should be available for rapid access by the threads or cores running on processor set 910. Cache memories are typically organized into multiple levels depending upon relative proximity to the processing circuitry. Alternatively, some, or all, of the cache for the processor set may be located "off chip." In some computing environments, processor set 910 may be designed for working with qubits and performing quantum computing.

Computer readable program instructions are typically loaded onto computer 901 to cause a series of operational steps to be performed by processor set 910 of computer 901 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 921 and the other storage media discussed below. The program instructions, and associated data, are accessed by processor set 910 to control and direct performance of the inventive methods. In computing environment 900, at least some of the instructions for performing the inventive methods may be stored in block 1000 in persistent storage 913.

COMMUNICATION FABRIC 911 is the signal conduction path that allows the various components of computer 901 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 912 is any type of volatile memory now known or to be developed in the future. Examples include dynamic type random access memory (RAM) or static type RAM. Typically, volatile memory 912 is characterized by random access, but this is not required unless affirmatively indicated. In computer 901, the volatile memory 912 is located in a single package and is internal to computer 901, but, alternatively or additionally, the volatile memory may be distributed over multiple packages and/or located externally with respect to computer 901.

PERSISTENT STORAGE 913 is any form of non-volatile storage for computers that is now known or to be developed in the future. The non-volatility of this storage means that the stored data is maintained regardless of whether power is being supplied to computer 901 and/or directly to persistent storage 913. Persistent storage 913 may be a read only memory (ROM), but typically at least a portion of the persistent storage allows writing of data, deletion of data and re-writing of data. Some familiar forms of persistent storage include magnetic disks and solid state storage devices. Operating system 922 may take several forms, such as various known proprietary operating systems or open source Portable Operating System Interface-type operating systems that employ a kernel. The code included in block 1000 typically includes at least some of the computer code involved in performing the inventive methods.

PERIPHERAL DEVICE SET 914 includes the set of peripheral devices of computer 901. Data communication connections between the peripheral devices and the other components of computer 901 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 923 may include components such as a display screen, speaker, microphone, wearable devices (such as goggles and smart watches), keyboard, mouse, printer, touchpad, game controllers, and haptic devices. Storage 924 is external storage, such as an external hard drive, or insertable storage, such as an SD card. Storage 924 may be persistent and/or volatile. In some embodiments, storage 924 may take the form of a quantum computing storage device for storing data in the form of qubits. In embodiments where computer 901 is required to have a large amount of storage (for example, where computer 901 locally stores and manages a large database) then this storage may be provided by peripheral storage devices designed for storing very large amounts of data, such as a storage area network (SAN) that is shared by multiple, geographically distributed computers. IoT sensor set 925 is made up of sensors that can be used in Internet of Things applications. For example, one sensor may be a thermometer and another sensor may be a motion detector.

NETWORK MODULE 915 is the collection of computer software, hardware, and firmware that allows computer 901 to communicate with other computers through WAN 902. Network module 915 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 915 are performed on the same physical hardware device. In other embodiments (for example, embodiments that utilize software-defined networking (SDN)), the control functions and the forwarding functions of network module 915 are performed on physically separate devices, such that the control functions manage several different network hardware devices. Computer readable program instructions for performing the inventive methods can typically be downloaded to computer 901 from an external computer or external storage device through a network adapter card or network interface included in network module 915.

WAN 902 is any wide area network (for example, the internet) capable of communicating computer data over non-local distances by any technology for communicating computer data, now known or to be developed in the future. In some embodiments, the WAN 902 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 903 is any computer system that is used and controlled by an end user (for example, a customer of an enterprise that operates computer 901), and may take any of the forms discussed above in connection with computer 901. EUD 903 typically receives helpful and useful data from the operations of computer 901. For example, in a hypothetical case where computer 901 is designed to provide a recommendation to an end user, this recommendation would typically be communicated from network module 915 of computer 901 through WAN 902 to EUD 903. In this way, EUD 903 can display, or otherwise present, the recommendation to an end user. In some embodiments, EUD 903 may be a client device, such as thin client, heavy client, mainframe computer, desktop computer and so on.

REMOTE SERVER 904 is any computer system that serves at least some data and/or functionality to computer 901. Remote server 904 may be controlled and used by the same entity that operates computer 901. Remote server 904 represents the machine(s) that collect and store helpful and useful data for use by other computers, such as computer 901. For example, in a hypothetical case where computer 901 is designed and programmed to provide a recommendation based on historical data, then this historical data may be provided to computer 901 from remote database 930 of remote server 904.

PUBLIC CLOUD 905 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 905 is performed by the computer hardware and/or software of cloud orchestration module 941. The computing resources provided by public cloud 905 are typically implemented by virtual computing environments that run on various computers making up the computers of host physical machine set 942, which is the universe of physical computers in and/or available to public cloud 905. The virtual computing environments (VCEs) typically take the form of virtual machines from virtual machine set 943 and/or containers from container set 944. It is understood that these VCEs may be stored as images and may be transferred among and between the various physical machine hosts, either as images or after instantiation of the VCE. Cloud orchestration module 941 manages the transfer and storage of images, deploys new instantiations of VCEs and manages active instantiations of VCE deployments. Gateway 940 is the collection of computer software, hardware, and firmware that allows public cloud 905 to communicate through WAN 902.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 906 is similar to public cloud 905, except that the computing resources are only available for use by a single enterprise. While private cloud 906 is depicted as being in communication with WAN 902, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 905 and private cloud 906 are both part of a larger hybrid cloud.

CONCLUSION

The descriptions of the various embodiments of the present teachings have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

The components, steps, features, objects, benefits, and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to a flowchart illustration and/or block diagram of a method, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of an appropriately configured computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The call-flow, flowchart, and block diagrams in the figures herein illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, the inventive subject matter lies in less than all features of a single disclosed embodiment. Thus, the following claims are hereby incorporated into the Detailed Description, with each claim standing on its own as a separately claimed subject matter.

What is claimed is:

1. A computer-implemented method for developing a hierarchical machine-learning pipeline, comprising:

receiving a hierarchy specification, the hierarchy specification providing a root node, transformer nodes, and edges interconnecting the root node and the transformer nodes;

receiving a set of estimators for the root node, and one or more transformer options for each of the transformer nodes;

obtaining a rank for each estimator in the root node;

traversing, using a hierarchy pipeline traverser, a first child layer of the transformer nodes connected to the root node via one of the edges; and determining a first ranked list of pathways with respect to the one or more transformer options selected for the first child layer and at least one selected estimator of the root node.

2. The computer-implemented method of claim 1, further comprising obtaining a ranked list of traversal options at the root node.

3. The computer-implemented method of claim 1, further comprising selecting a predefined number of estimators based on the rank for the at least one selected estimator of the root node.

4. The computer-implemented method of claim 1, further comprising:

traversing, using the hierarchy pipeline traverser, a second child layer of the transformer nodes connected to either the first child layer or the root node by one of the edges; and determining a second ranked list of pathways with respect to the one or more transformer options selected for the first child layer, the second child layer, and the at least one selected estimator of the root node.

5. The computer-implemented method of claim 1, further comprising selecting the set of estimators for the root node and the one or more transformer options for each of the transformer nodes from a knowledge base.

6. The computer-implemented method of claim 1, further comprising placing preferred ones of the transformer nodes in a layer of the hierarchy specification closer to the root node as compared to non-preferred ones of the transformer nodes.

7. The computer-implemented method of claim 1, further comprising placing the transformer nodes having a greater time and/or memory complexity in a layer of the hierarchy specification farther away from the root node.

8. The computer-implemented method of claim 7, wherein the time and/or the memory complexity of the transformer nodes is received from a knowledge base.

9. The computer-implemented method of claim 1, further comprising providing annotations for each of the edges, wherein the annotations include an insert edge, an append edge, or a replace edge.

10. The computer-implemented method of claim 1, further comprising receiving a configuration specification that defines preferences, priorities and/or constraints to be used by the hierarchy pipeline traverser.

11. The computer-implemented method of claim 10, wherein the configuration specification defines the preferences, the priorities and/or the constraints for at least one of the root node or the transformer nodes or for at least one of the edges.

12. A computer-implemented method for developing a hierarchical machine-learning pipeline, comprising:

receiving a hierarchy specification, the hierarchy specification providing a root node, transformer nodes, and edges interconnecting the root node and the transformer nodes;

receiving a set of estimators for the root node, and one or more transformer options for each of the transformer nodes;

receiving a configuration specification, the configuration specification defining preferences, priorities and/or constraints to be used by a hierarchy pipeline traverser;

obtaining a rank for each estimator in the root node;

traversing, using the hierarchy pipeline traverser, a first child layer of the transformer nodes connected to the root node via one of the edges;

determining a first ranked list of pathways with respect to the one or more transformer options selected for the first child layer and at least one selected estimator of the root node;

traversing, using the hierarchy pipeline traverser, a second child layer of the transformer nodes connected to either the first child layer or the root node by one of the edges; and determining a second ranked list of pathways with respect to the one or more transformer options selected for the first child layer, the second child layer, and the at least one selected estimator of the root node.

13. The computer-implemented method of claim 12, further comprising selecting a predefined number of estimators based on the rank for the at least one selected estimator of the root node.

14. The computer-implemented method of claim 12, further comprising receiving the set of estimators for the root node and the one or more transformer options for each of the transformer nodes from a knowledge base.

15. The computer-implemented method of claim 12, further comprising placing preferred ones of the transformer nodes in a layer of the hierarchy specification closer to the root node as compared to non-preferred ones of the transformer nodes.

16. The computer-implemented method of claim 12, further comprising placing the transformer nodes having a greater time and/or memory complexity in a layer of the hierarchy specification farther away from the root node.

17. The computer-implemented method of claim 12, further comprising providing annotations for each of the edges, wherein the annotations include an insert edge, an append edge, or a replace edge.

18. A non-transitory computer readable storage medium tangibly embodying a computer readable program code having computer readable instructions that, when executed, causes a computer device to carry out a method for developing a hierarchical machine-learning pipeline, the method comprising:

receiving a hierarchy specification, the hierarchy specification providing a root node, transformer nodes, and edges interconnecting the transformer nodes;

receiving a set of estimators for the root node, and one or more transformer options for each of the transformer nodes;

obtaining a rank for each estimator in the root node;

traversing, using a hierarchy pipeline traverser, a first child layer of the transformer nodes connected to the root node via one of the edges; and determining a first ranked list of pathways with respect to the one or more transformer options selected for the first child layer and at least one selected estimator of the root node.

19. The non-transitory computer readable storage medium of claim 18, the method further comprising providing annotations for each of the edges, wherein the annotations including an insert edge, an append edge, or a replace edge.

20. The non-transitory computer readable storage medium of claim 18, the method further comprising receiving a configuration specification, the configuration specification defining preferences, priorities and/or constraints to be used by the hierarchy pipeline traverser.

* * * * *